(12) United States Patent
Torres et al.

(10) Patent No.: US 7,558,382 B2
(45) Date of Patent: Jul. 7, 2009

(54) MONITORING SERVICE PERSONNEL

(75) Inventors: Oscar Pablo Torres, Buenos Aires (AR); Jorge Alfredo Recalde, Buenos Aires (AR); Bruce Sharpe, Aurora, CO (US)

(73) Assignee: Teletech Holdings, Inc., Englewood, CO (US)

( * ) Notice: Subject to any disclaimer, the term of this patent is extended or adjusted under 35 U.S.C. 154(b) by 464 days.

(21) Appl. No.: 11/291,759

(22) Filed: Nov. 30, 2005

(65) Prior Publication Data

US 2009/0016522 A1    Jan. 15, 2009

(51) Int. Cl.
*H04M 11/00* (2006.01)

(52) U.S. Cl. .............................. 379/106.01; 379/265.06

(58) Field of Classification Search .............. 379/93.17, 379/265.06, 265.03, 106.01, 106.02, 90.01, 379/93.01

See application file for complete search history.

(56) References Cited

U.S. PATENT DOCUMENTS 6,865,604 B2    3/2005  Nisani et al.
6,871,229 B2    3/2005  Nisani et al.
6,959,078 B1 *  10/2005 Eilbacher et al. ........ 379/265.03

OTHER PUBLICATIONS

Search Report dated Sep. 26, 2008 in Application Serial No. PCT/US06/46245, File Ref. No. 40455.4WO01, 9 pp.

* cited by examiner

*Primary Examiner*—Stella L Woo
(74) *Attorney, Agent, or Firm*—Stanley J. Gradisar

(57) ABSTRACT

An approach for monitoring interaction between individuals engaged in a communication session is disclosed. The individuals are described herein as a customer service representative and a customer and the communication session is accomplished over a communication network. Audio data embodying the communication session is copied and stored to a media file in conjunction with video data captured by a video capture device monitoring the customer service representative. The media file is a data structure in which the audio data and the video data are stored in segmented fashion. Each segment of audio data is associated with a segment of video data based on a common time reference, thereby providing synchronized documentation of the communication session. The media file is stored on a database and available to a supervisor using a server computer to monitor the communication session for quality assurance or other evaluation purposes.

20 Claims, 7 Drawing Sheets

| TIME REFERENCE | VIDEO DATA | AUDIO DATA | |
|---|---|---|---|
| | | INCOMING | OUTGOING |
| 0 SEC - 5 SEC | VIDEOSEG1 | INAUDIOSEG1 | OUTAUDIOSEG1 |
| 5 SEC - 10 SEC | VIDEOSEG2 | INAUDIOSEG2 | OUTAUDIOSEG2 |
| 10 SEC - 15 SEC | VIDEOSEG3 | INAUDIOSEG3 | OUTAUDIOSEG3 |
| 15 SEC - 20 SEC | VIDEOSEG4 | INAUDIOSEG4 | OUTAUDIOSEG4 |
| 20 SEC - 25 SEC | VIDEOSEG5 | INAUDIOSEG5 | OUTAUDIOSEG5 |

FIG.3

MONITORING SERVICE PERSONNEL

TECHNICAL FIELD

This invention generally relates to monitoring interaction between individuals, and more particularly to interaction between customer service representatives and customers.

BACKGROUND

A customer service session typically involves a customer interacting with a customer service representative over a teleconference. Oftentimes, a company on behalf of which the session is being conducted will monitor the interaction between the customer service representative and the customer for external as well as internal purposes. For example, an external purpose relates to providing documentation of the interaction in the case that the customer or customer service representative later disputes any agreements or promises made during the session. Such recordation provides an invaluable tool, especially when the interaction involves the sale of a good or service. An example of an internal purpose relates to providing documentation of the interaction for use in later performing a quality assurance assessment of the session or otherwise evaluating the efficiency and demeanor of the customer service representative.

Originally, customer service sessions were monitored using audio recorders positioned in close relation to the customer service representative's office space. As a customer call was connected to the customer service representative's phone, the customer service representative would be responsible for initiating a recording session and maintaining that recording session until completion of the call. Modern systems, however, are much more advanced and shift the responsibility of initiating recording sessions from the customer service representative to a computer.

FIG. 1, for example, illustrates a conventional computer-based monitoring system 100 for use in documenting interaction between a customer service representative and a customer. Customer service sessions are typically initiated by a customer calling a customer service representative using a phone 102. Once dialed, the call is connected to a customer service representative's phone 106 by way of the Public-Switched Telephone Network (PSTN) 104.

As is common with large companies, a number of customer service representatives are employed to take customer service calls, however, at any given time, very few or none might be available. Therefore, an automatic control distribution (ACD) module 108 may be used to accept customer service calls from the PSTN 104 and select the most appropriate customer service representative for interaction with the calling customer. Oftentimes, the most appropriate customer service representative will be selected from an available customer service representative or, if all customer service representatives are currently busy with other customers, the customer service representative having the shortest queue (assuming that a number of other calling customers are on hold). The automatic control distribution module 108 serves as a gateway into the company's internal network from the PSTN 104 and is thus assigned a specific telephone number for accepting calls on behalf of the company's customer service department.

The monitoring system 100 includes an audio recording component 112, a scheduling component 114, a video capture device 116 for each customer service representative, two databases 118 and 120 and a server computer 122. A first 118 of the two databases stores video data captured from the video capture devices 116 while the other database 120 stores audio data captured by the audio recording component 112, as shown using data communication lines 126 and 130, respectively. Each video capture device 116 is positioned relative to a customer service representative in order to record the movements and actions of the customer service representatives during service sessions. The audio recording component 112 is communicatively connected to the ACD module 108 by way of a first data communication link 124, such as a T1 transmission line. The scheduling component 114 is connected communicatively connected to the ACD module 108 by way of a second data communication link 126, which is referred to as a CTI link.

In response to receiving a call on the PSTN 104, the ACD module 108 selects the appropriate customer service representative based on any number of considerations (as described above) and transmits a signal over the CTI link 126 to the scheduling module 114 that identifies the selected customer service representative. The scheduling module 114 determines whether the selected customer service representative is due for monitoring and, if so, instructs the audio recording component 112 and the video capture device 116 associated with the selected service representative to record the service session between the customer and the selected customer service representative. Furthermore, the scheduling component 114 instructs the ACD module 108 via the CTI line 126 that the current session has been selected for recording and, in response to such instruction, the ACD module 108 provides an audio feed of the entire conversation to the audio recording component 112 over the T1 line 124. Basically, the audio recording component 112 administers a high impedance tap of the T1 line 124 and records the audio interaction of the current session while the video capture device 116 records the movements and actions of the selected customer service representative during the session.

Audio data recorded by the audio recording component 112 is saved to the audio database 120 and video data recorded by the video capture device 116 is saved to the video database 118. More specifically, for each recorded service session, the audio database 120 stores an audio file documenting the vocal interaction between the customer and selected customer service representative. Likewise, the video database 118 stores a video file for each recorded service session that documents the actions and movements of the selected customer service representative.

The server computer 122, which is communicatively connected to both the audio and video databases 118 and 120 via the playback server 121, is used by supervisors to monitor recorded service sessions. To provide functionality for monitoring a specific service session, the server computer 122 first accesses the playback server 121 and requests playback of the service session. The playback server 121 retrieves the corresponding audio file from the audio database 120 and the corresponding video file from the corresponding video database 118 and thereafter streams the to the server computer 122 concurrently with one another such that the supervisor is provided with both video and audio documentation of the specified service session at the same time.

While computer-based monitoring certainly has advantages over the prior manual approach, there is room for much improvement. For example, the intended simultaneous playback of audio and video files on the server computer 122 is often out of synch. With that said, the video playback often lags behind the audio playback or, vice-versa. Furthermore, current monitoring systems, such as the system 100 shown in FIG. 1, are off-the-shelf type systems that either include unnecessary features or, alternatively, lack required features.

While unnecessary features tend to slow down certain processing functions thereby bogging down the system altogether, systems that lack features are typically incompatible with certain implementations.

It is with respect to these and other considerations that the present invention has been made.

SUMMARY OF THE INVENTION

The present invention is generally related to monitoring interaction between individuals engaged in a communication session. The communication session is accomplished over a communication network, to which the individuals are communicatively connected by way of communication devices. More particularly, the present invention involves recording both interactive data and activity data concerning the communication session and storing both forms of data in association with one another in a single media file. The interactive data embodies information concerning the communication between the individuals such as, without limitation, voice or other audio information, email information and chat information. Accordingly, the communication devices used by the individuals may be phones, email client applications or chat client applications. The activity data embodies information concerning a physical activity by one or both of the individuals such as, for example, video camera recordings (e.g., physical movement of an individual), computer screen activities, mouse movements and keyboard actions. The media file is saved and made available for future playback purposes. For example, if the media file documents interaction between a customer service representative and a customer, then future playback may be desired for quality assurance and other forms of evaluation.

An embodiment of the present invention is practiced as a method that involves receiving the interactive data during transmission between the communication network and a communication device used by an individual participating in the communication session. The method further includes capturing activity data that embodies actions and movements by that same individual during the session. In receipt of both forms of data, the method involves associating segments of the interactive data with segments of the activity data according to a common time reference thereby substantially synchronizing the interactive data and the activity data for subsequent playback.

In another embodiment, the present invention relates to a system for monitoring interaction of an individual that participates in communication sessions with other individuals over a communication network. This system has, among other things, a monitoring module, a client computer and a media file. The monitoring module selects specific communication sessions directed to the individual for recording. The client computer is communicatively connected to the communication network as well as to any communication devices used by the individual to participate in the communication sessions. As such, the client computer receives and copies any interactive data transmitted between the communication device and the communication network. The client computer also includes an activity capture application operable to monitor activity data concerning the recorded communication session.

The media file includes the interactive data copied by the client computer during a selected communication session as well as the activity data recorded by the client computer during that same communication session. Also, the interactive data and the activity data are synchronized in the media file according to a common time reference. In accordance with this embodiment, the system may also include a server computer on which the media file is played back for various types of monitoring purposes.

The various embodiments of the present invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 3 depicts a representation of the relation between recorded interactive data and recorded activity data in a media file created using the monitoring system shown in FIG. 2 in accordance with an embodiment of the present invention.

DETAILED DESCRIPTION

Figure 1:
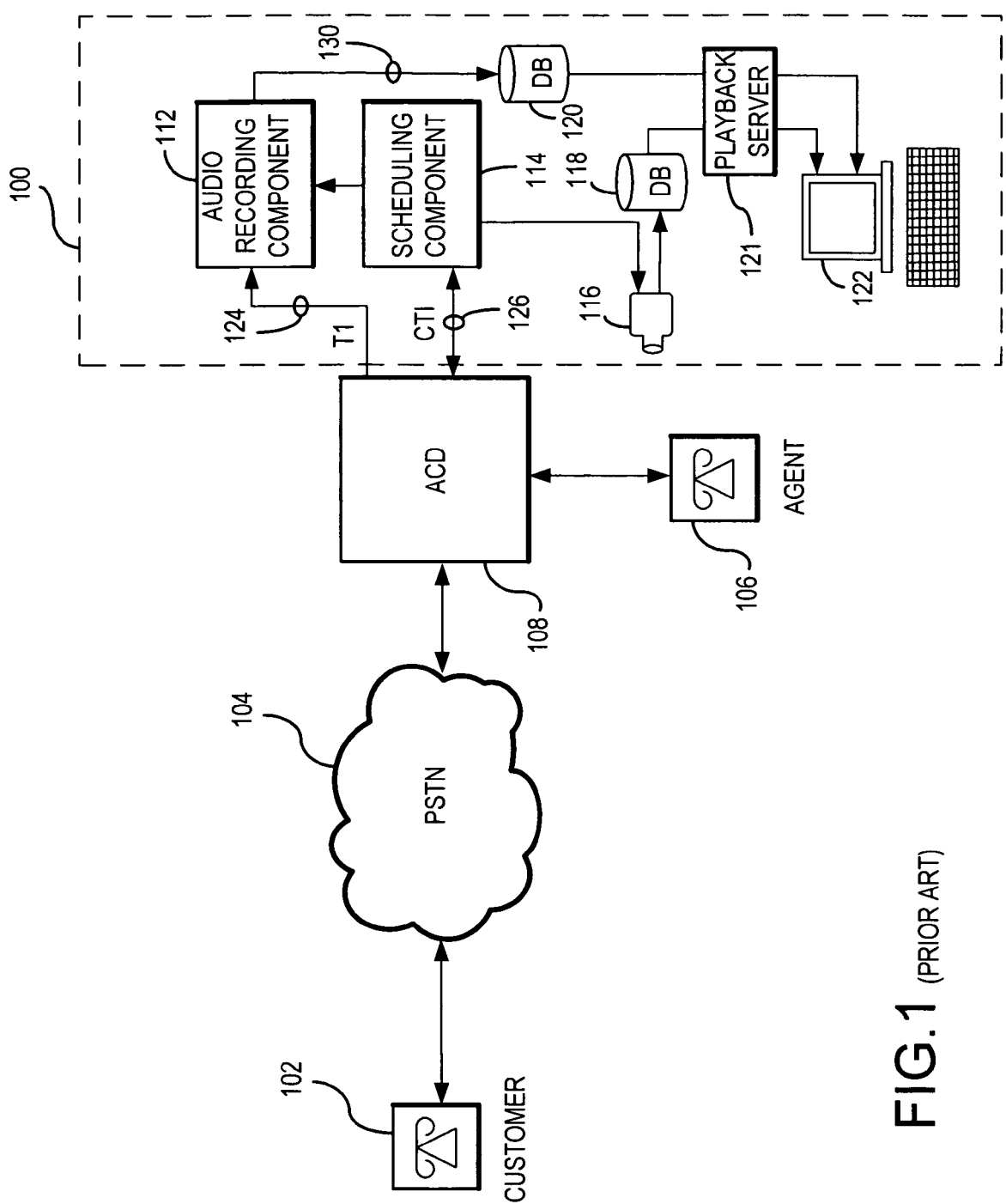
FIG. 1 illustrates a prior art system for monitoring interaction between a customer service representative and a customer.

The present invention and its various embodiments are described in detail below with reference to the figures. When referring to the figures, like structures and elements shown throughout are indicated with like reference numerals. Objects depicted in the figures that are covered by another object, as well as the reference annotations thereto, are shown using dashed lines.

The present invention is generally directed to monitoring interaction between individuals for future evaluation or documentation purposes. With that said, an exemplary embodiment involves monitoring interactions between a customer and a customer service representative and, the present invention is hereinafter described as such. The customer service representative may be employed on behalf of a company to communicate with customers in any capacity involving any matter pertaining to the company. For example, the customer service representative may discuss sales, product support as well as service or product installation with a customer and these exemplary interactions may be the subject of monitoring in accordance with the present invention.

Figure 2:
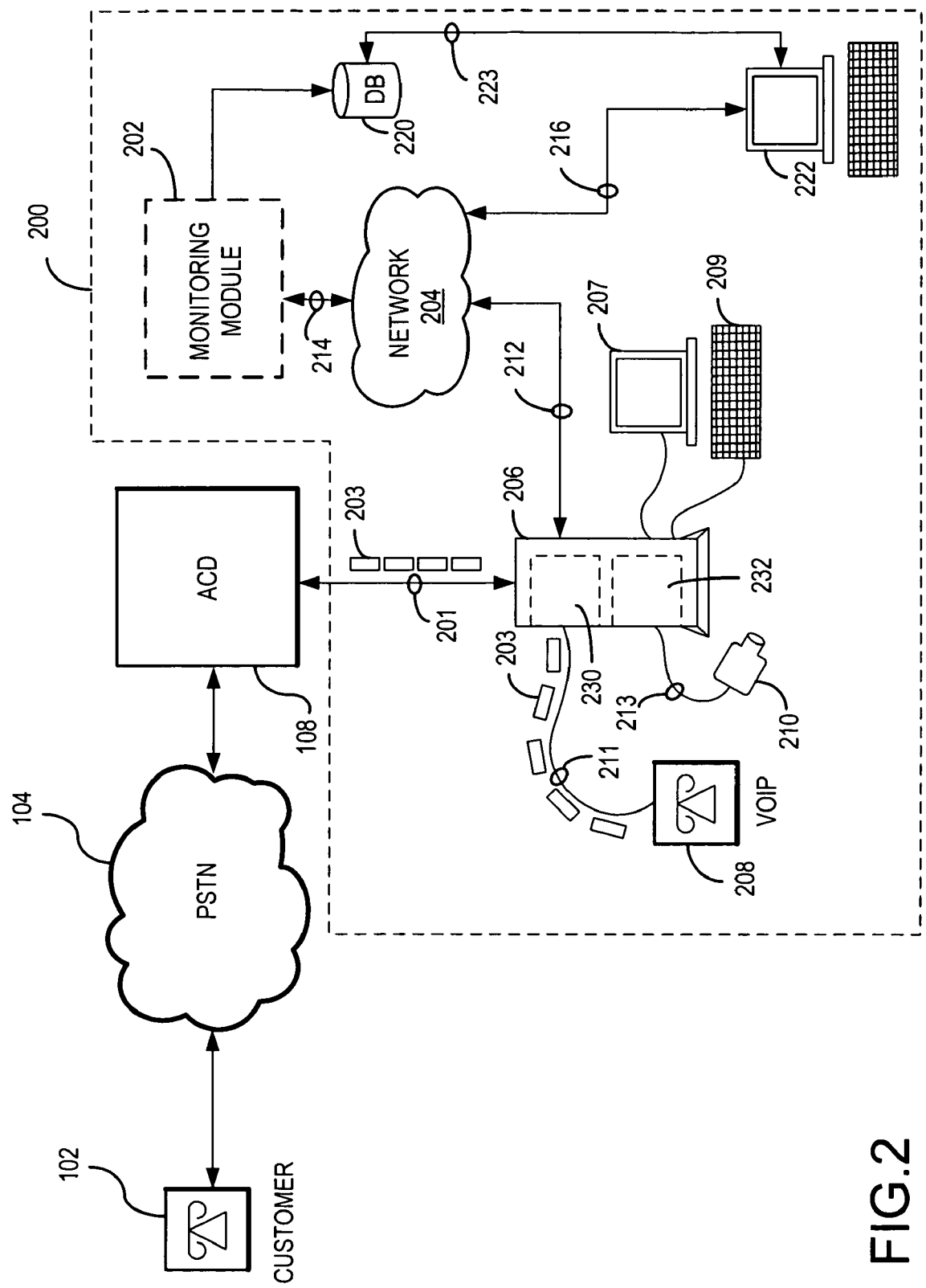
FIG. 2 illustrates a system for monitoring interaction between a customer service representative and a customer in accordance with an embodiment of the present invention.

With the general environment in which embodiments of the present invention are applicable provided above, FIG. 2 depicts, in block diagram form, a system 200 for monitoring (hereinafter, "monitoring system") communication sessions between a customer and a customer service representative in accordance with an embodiment of the present invention. The monitoring system 200 includes a monitoring module 202, a client computer 206 (hereinafter, "agent terminal"), which is assigned to each customer service representative and on which is implemented an interactive data recording application 230 and an activity recording application 232, a voice over Internet Protocol (VOIP) soft phone 208 (optional) connected to each agent terminal 206, a video capture device 210 (optional) also connected (by video card) to each agent terminal 206, an internal communication network 204 (hereinafter, "intranet"), a database 220 and a server computer 222. For illustration purposes, the monitoring system 200 is shown in FIG. 2 and described relative to monitoring only one customer service representative, however, it should be appreciated that numerous customer service representatives may be monitored and thus, any number of agent terminals 206 (including interactive data recording applications 230 and activity recording applications 232), VOIP phones 208 (optional) and video capture devices 210 (optional) are contemplated to be part of the monitoring system 200.

Figure 4:
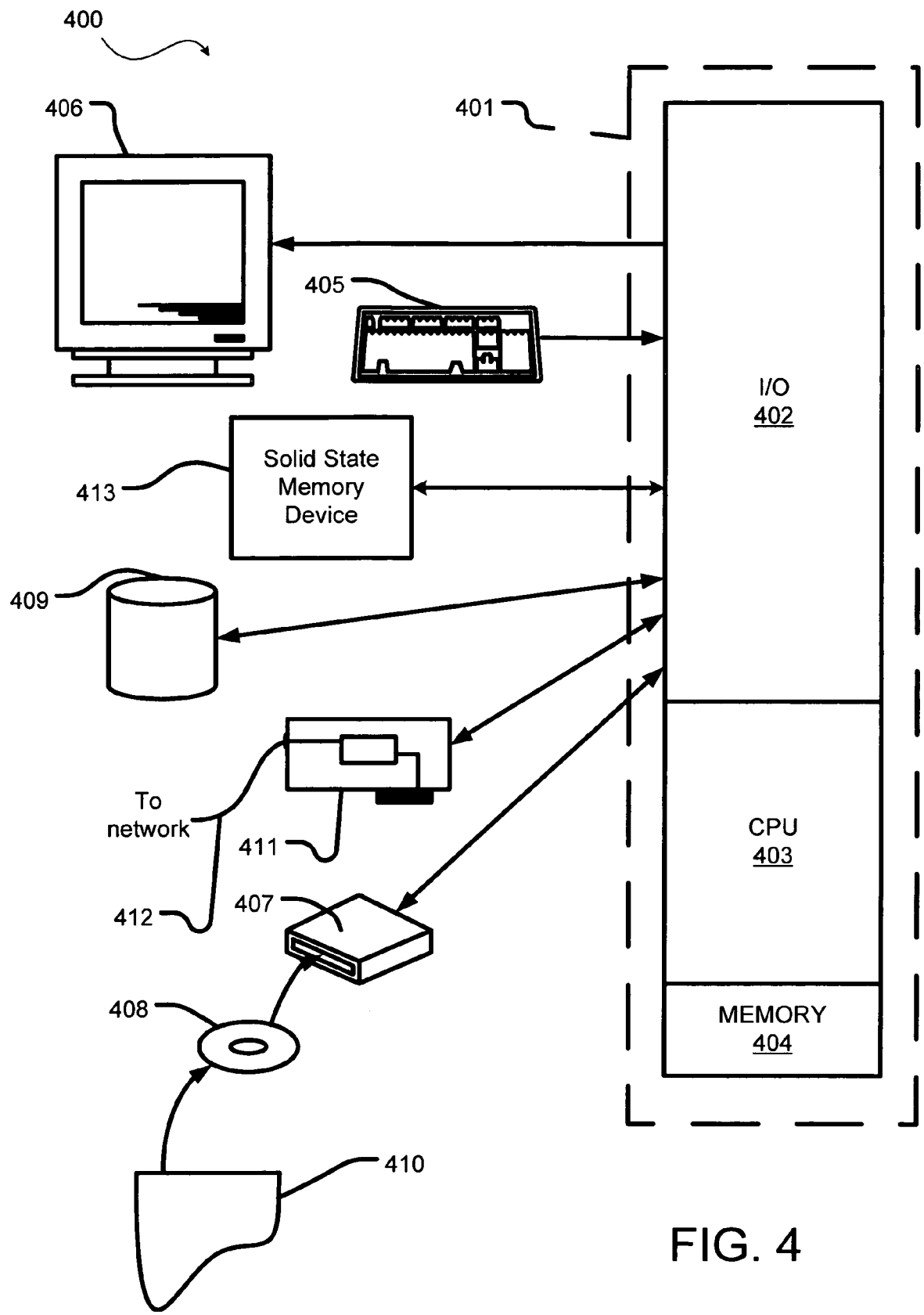
FIG. 4 depicts an exemplary computing environment upon which embodiments of the present invention may be implemented.

The monitoring module 202 manages overall implementation of the system 200 and, in accordance with an embodiment, is implemented as a software application residing in a computing environment, an exemplary depiction of which is shown in FIG. 4 and described below in conjunction therewith. With that said, the computing environment may be made up of the agent terminal 206, the server computer 222 and/or a central server computer (not shown), each of which are communicatively connected with one another by way of the intranet 204. If the monitoring module 202 is implemented on or otherwise accessible to more than one of these computing systems, the environment is coined a "distributed" computing environment. Because the monitoring module 202 may be implemented on or otherwise accessible to any one or more of these computing systems, the monitoring module 202 is shown in FIG. 2 in general form using a block and dashed lines. Indeed, the present invention is not limited to any particular implementation for the monitor module 202 and instead embodies any computing environment upon which functionality of the monitoring module 202, as described below and in conjunction with FIGS. 5 and 6, may be practiced.

The intranet 204 may be any type of network conventionally known to those skilled in the art and is described in accordance with an exemplary embodiment to be a packet-switched network (e.g., an Internet Protocol (IP) network). As such, the monitoring module 202, the agent terminal 206 and the server computer 222 are each operable to communicate with one another over the intranet 204 according to one or more standard packet-based formats (e.g., H.323, IP, Ethernet, ATM).

Connectivity to the intranet 204 by the agent terminal 206, the monitoring module 202 and the server computer 222 is accomplished using wire-based communication media, as shown using data communication links 212, 214 and 216, respectively. The data communication links 212, 214 and 216 may additionally or alternatively embody wireless communication technology. It should be appreciated that the manner of implementation in this regard is a matter of choice and the present invention is not limited to one or the other, but rather, either wireless or wire-based technology may be employed alone or in combination with the other.

Each customer service representative is provided an agent terminal 206 that is communicatively connected to an ACD 108 by a communication link 201 (again, either wireless or wire-based) in accordance with an embodiment of the present invention. Alternatively, the ACD 108 may communicate with the agent terminal 206 by way of the intranet 204. In response to receiving an incoming call, the ACD 108 selects the appropriate customer service representative based on any number and type of considerations (e.g., availability, specialty, etc.) and connects the call to the corresponding agent terminal 206.

In addition, the ACD 108 serves as a packet gateway, or "soft switch," which converts the incoming Time Division Multiplexed (TDMA) signals from the PSTN 104 into a packet-based format according to one or more standards (e.g., H.323, IP, Ethernet, ATM), depending on the level of encapsulation desired within the monitoring system 200. The audio information accepted from the PSTN 104 is therefore provided to the agent terminal 206 in packets 203 that may be interpreted by the agent terminal 206, which as noted above is a computer system.

The VOIP phone 208 and the video capture device 210 (if utilized) are both communicatively connected to input/output ports (e.g., USB port, firewire port, etc.) on the agent terminal 206 by way of data communication lines 211 and 213. In an embodiment, the agent terminal 206 is a desktop computer having a monitor 207 and a keyboard 209 in accordance with an exemplary embodiment, but alternatively may be a laptop computer. As noted above, the agent terminal 206 includes two software applications for use in administering embodiments of the present invention—the interactive data recording application 230 and the activity recording application 232. The interactive data recording application 230 records communications between customers and the customer service representative assigned to the agent terminal 206. For example, the interactive data recording application 230 records any voice data packets transmitted between the ACD 108 and the VOIP phone 208. Additionally, the interactive data recording application 230 may record any other audio information, email information or chat information embodying interaction between the customer and the customer service representative. The activity recording application 232 records various forms of activity performed by the customer service representative assigned to the agent terminal 206 during such customer interaction. For example, the activity recording application 232 receives and records video data from the video capture device 201 (by USB, serial or other connection) and, in an embodiment, also monitors other forms of information such as, for example, computer screen activities, mouse movements and keyboard actions.

Briefly describing functionality of the monitoring system 200 relative to phone communications, after selecting a customer service representative to accept a service call, the ACD module 108 begins converting the audio information embodied in the service call to the packet-based format and streaming the resulting packets 203 to the agent terminal 206. Concurrently, the monitoring module 202 detects incoming packets to the agent terminal 206 and determines whether the selected customer service representative is due for recording. Various factors may go into such a determination and the present invention is not limited to any particular factors. Indeed, in some embodiments, each customer service representative is recorded on a periodic basis (e.g., every tenth service session), whereas in other embodiments, all sessions with one or more particular customer service representatives are recorded.

Regardless of the manner of implementation, if the monitoring module 202 determines that the selected customer service representative is due for recording, then the monitoring module 202 creates an empty media file for use in storing data recorded during the service session. In an embodiment, the blank, or "skeleton," media file is created on the agent terminal 206 and embodies a data structure that will store both the interactive data and the activity data recorded during the service session. In accordance with an exemplary embodiment, the interactive data is described in connection with this illustration as embodying the audio communication (e.g., voice data) between the customer and the selected customer service representative and, in an embodiment, is divided into a plurality of contiguous segments of a predetermined size (corresponding to predetermined length in time). The activity data includes information documenting activities of the customer service representative working at the monitored agent terminal 206 during the customer service session. Such information includes, but is not limited to, screen activities, mouse movements, keyboard actions, video camera recordings and any other internal or external device activity. Like the interactive data, the activity data is also divided into a plurality of contiguous segments of the same predetermined size (corresponding to predetermined length in time) as the interactive data segments to provide for facilitated synchronization. A more detailed explanation of receiving and storing the interactive data and the activity data is provided below in conjunction with FIG. 6.

After the media file is created, the monitoring module 202 begins copying the interactive data from both incoming (i.e., carrying customer voice data) and outgoing (i.e., carrying customer representative voice data) packets 203 and storing the copied interactive data to the media file while, at substantially the same time, instructs the activity recording application 232 to begin recording the customer service representative's activity, the output from which is also directed to the media file. To illustrate, an exemplary embodiment involves the activity recording application 232 receiving and records video data from the video capture device 210, wherein the video data documents movement and physical activity of the customer service representative during the recorded customer service session. After the interactive data has been copied from the packets 203, the agent terminal 206 outputs the packets 203 to either the VOIP phone 208 or to the ACD module 108, depending on whether the packet is an incoming packet or an outgoing packet.

An exemplary representation 300 of the relation between interactive data and activity data in a media file is shown in FIG. 3 in accordance with an embodiment of the present invention. Again, for illustration purposes only, the interactive data is described in the illustration of FIG. 3 as being audio data embodying voice communications between a customer and a customer service representative and the activity data is described as embodying video data from the video capture device 210. As repeatedly mentioned above, other forms of interactive data and activity data are certainly contemplated to be within the scope of the present invention.

The representation 300 shown in FIG. 3 illustrates that the media file is made up of a plurality of audio segments 302, which in an embodiment are separately embodied in incoming audio sub-segments 302a and outgoing audio sub-segments 302b, and a plurality of video segments 304, each of which are associated with one another by a time reference 306. In accordance with this embodiment, these time associations (i.e., time references 306) between the audio segments 302 and the video segments 304 are established by the monitoring module 202 as the segments 302 and 304 are being received by the agent terminal 206. Accordingly, the video segments 304 and the audio segments 302 are synchronized based on a common time reference, which in an exemplary embodiment, is a clock on the agent terminal 206. Additionally, the monitoring module 202 identifies each media file with a specific identifier that uniquely identifies both the customer service representative and the particular service session for which the file has been created. For example, the file name for the media file may be used to associate the media file with such a unique identification.

Media files are uploaded by the monitoring module 202 from the agent terminals 206 to the database 220 for storage and subsequent access by the server computer 222. The transfer of media files between agent terminals 206 and the server computer 222 is accomplished over the intranet 204. In an embodiment, the monitoring module 202 administers media file uploads to the database 220 at the completion of each recorded service session. Alternatively, the monitoring module 202 may perform media file uploads to the database 220 at the conclusion of a plurality of specified time intervals. Even further, monitoring module 202 may accomplish media file uploading to the database 220 in real time such that the agent terminal 206 administers the continuous transmission of the audio and the video data to the database 220 during recorded service sessions.

The server computer 222 is used by supervisors to monitor interaction between customer service representatives and customers by viewing recorded service sessions. The server computer is communicatively connected to the database 220 by way of the intranet 204. Alternatively, the server computer 222 may be provided a direct communication link 223 to the database 220. Regardless of the means of connectivity, the server computer 222 is operable for use by a supervisor to request a stored media file for playback.

In addition, a supervisor may use the server computer 222 to monitor interaction between customer service representatives and customers in substantially real time fashion. In accordance with this embodiment, the media file (including the recorded and time-associated interactive data and activity data) is streamed from the agent terminal 206 to a publishing point. Alternatively, in accordance with this embodiment, the interactive data and the activity data may be streamed to the publishing point from the agent terminal 206 in the form of raw data. In this embodiment, the raw interactive data and raw activity data are first streamed to streamer component (a software module component of the monitoring module 202) that performs the appropriate time association between the two forms of data thereby creating the media file for the session being recorded. Regardless of the implementation, the supervisor uses the server computer 222 to subscribe to the publishing point and remotely monitor customer service sessions as they occur.

In an embodiment, the media files are identified and also categorized in the database 220 based on one or all of the following: the customer service representative; the calendar date (and, optionally time) that the media file was created; DNIS; ANI; Start Time; and Stop Time. Accordingly, selection of the appropriate media file by the supervisor is a matter of selecting that file from a logically categorized group of files in the database 220 (e.g., by way of GUI). It should be appreciated that any conventional database retrieval application may be utilized to provide a front-end selection service for retrieving media files from the database 220 for playback on the server computer 222. Indeed, it is contemplated that such functionality may be programmed into the monitoring module 202.

An exemplary operating environment on which the monitoring module 202 is at least partially implemented encompasses a computing system 400, which is generally shown in FIG. 4. Data and program files are input to the computing system 400, which reads the files and executes the programs therein. Exemplary elements of a computing system 400 are shown in FIG. 4 wherein the processor 401 includes an input/output (I/O) section 402, a microprocessor, or Central Processing Unit (CPU) 403, and a memory section 404. The present invention is optionally implemented in this embodiment in software or firmware modules loaded in memory 404 and/or stored on a solid state, non-volatile memory device 413, a configured CD-ROM 408 or a disk storage unit 409.

The I/O section 402 is connected to a user input module 405, a display unit 406, etc., and one or more program storage devices, such as, without limitation, the solid state, non-volatile memory device 413, the disk storage unit 409, and the disk drive unit 407. The solid state, non-volatile memory device 413 is an embedded memory device for storing instructions and commands in a form readable by the CPU 403. In accordance with various embodiments, the solid state, non-volatile memory device 413 may be Read-Only Memory (ROM), an Erasable Programmable ROM (EPROM), Electrically-Erasable Programmable ROM (EEPROM), a Flash Memory or a Programmable ROM, or any other form of solid state, non-volatile memory. In accordance with this embodiment, the disk drive unit 407 may be a CD-ROM driver unit capable of reading the CD-ROM medium 408, which typically contains programs 410 and data. Alternatively, the disk drive unit 407 may be replaced or supplemented by a floppy drive unit, a tape drive unit, or other storage medium drive unit. Computer readable media containing mechanisms (e.g., instructions, modules) to effectuate the systems and methods in accordance with the present invention may reside in the memory section 404, the solid state, non-volatile memory device 413, the disk storage unit 409 or the CD-ROM medium 408. Further, the computer readable media may be embodied in electrical signals representing data bits causing a transformation or reduction of the electrical signal representation, and the maintenance of data bits at memory locations in the memory 404, the solid state, non-volatile memory device 413, the configured CD-ROM 408 or the storage unit 409 to thereby reconfigure or otherwise alter the operation of the computing system 400, as well as other processing signals. The memory locations where data bits are maintained are physical locations that have particular electrical, magnetic, or optical properties corresponding to the data bits.

In accordance with a computer readable medium embodiment of the present invention, software instructions stored on the solid state, non-volatile memory device 413, the disk storage unit 409, or the CD-ROM 408 are executed by the CPU 403. Data may be stored in memory section 404, or on the solid state, non-volatile memory device 413, the disk storage unit 409, the disk drive unit 407 or other storage medium units coupled to the system 400.

In accordance with one embodiment, the computing system 400 further comprises an operating system and one or more application programs. Such an embodiment is familiar to those of ordinary skill in the art. The operating system comprises a set of programs that control operations of the computing system 400 and allocation of resources. The set of programs, inclusive of certain utility programs, also provide a graphical user interface to the user. An application program is software that runs on top of the operating system software and uses computer resources made available through the operating system to perform application specific tasks desired by the user. The operating system is operable to multitask, i.e., execute computing tasks in multiple threads, and thus may be any of the following: any of Microsoft Corporation's "WINDOWS" operating systems, IBM's OS/2 WARP, Apple's MACINTOSH OSX operating system, Linux, UNIX, etc.

In accordance with yet another embodiment, the processor 401 connects to the intranet 204 by way of a network interface, such as the network adapter 411 shown in FIG. 4. Through this network connection, the processor 401 is operable to transmit within the monitoring system 200, as described, for example, in connection with the agent terminal 206 transmitting media files to the database 220.

With the computing environment of FIG. 4 in mind, logical operations of the various exemplary embodiments described below in connection with FIGS. 5 and 6 may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the exemplary embodiments described herein are referred to variously as operations, structural devices, acts or modules. It will be recognized by one skilled in the art that these operations, structural devices, acts and modules may be implemented in software, in firmware, in special purpose digital logic, and/or any combination thereof without deviating from the spirit and scope of the present disclosure as recited within the claims attached hereto.

Figure 5:
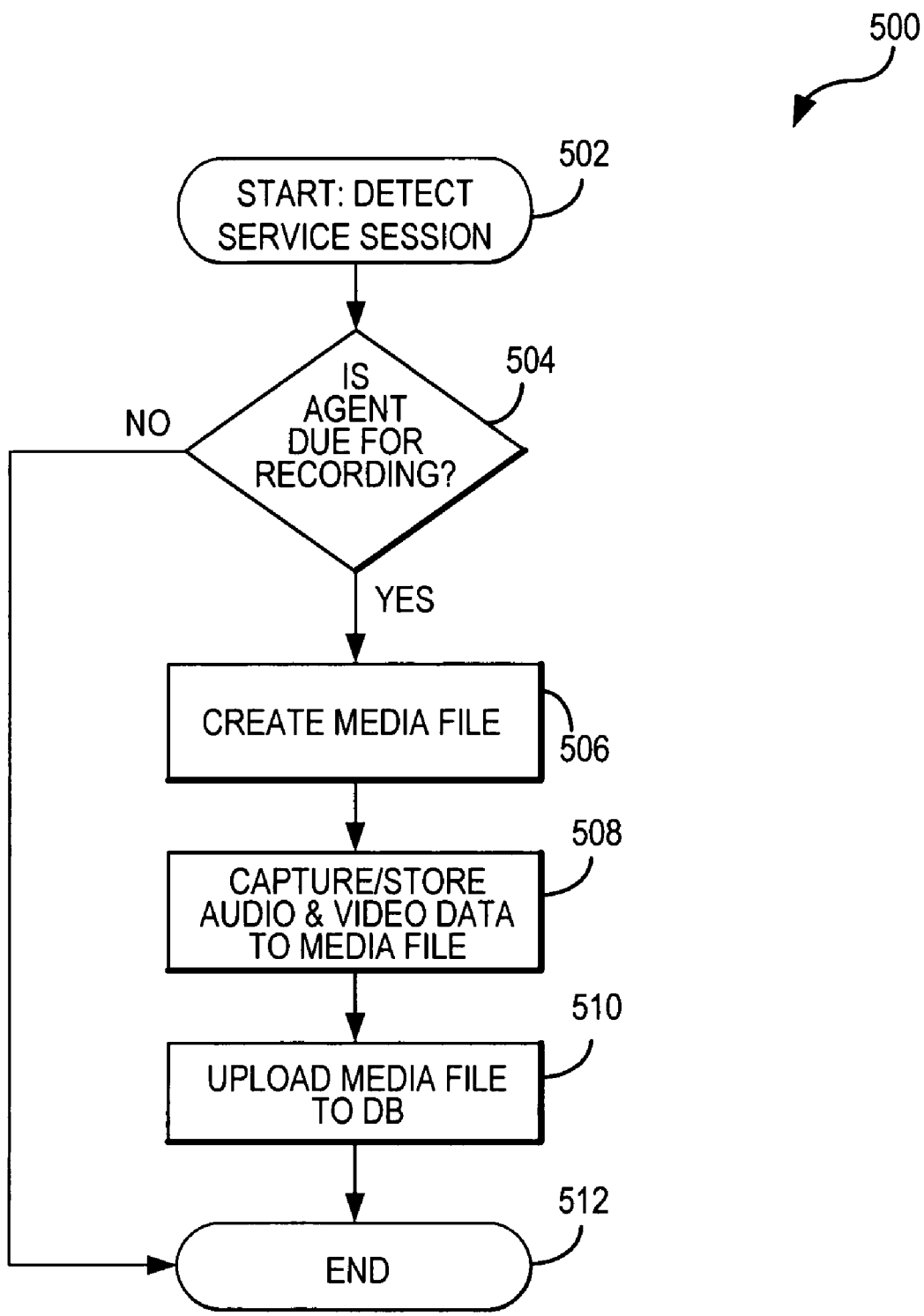
FIG. 5 is a flow diagram illustrating operational characteristics of a process for monitoring interaction between a customer service representative and a customer in accordance with an embodiment of the present invention.

Turning now to FIG. 5, a process 500 for recording interaction between a customer service representative and a customer is shown in accordance with an embodiment of the present invention. The recording process 500 embodies a sequence of computer-implemented operations practiced by a combination of components in the monitoring system 200, including the interactive data recording application 230, the activity recording application 232 and the monitoring module 202, the latter of which is implemented on either a stand-alone computer system, e.g., the agent terminal 206, the server computer 222 or a central server computer (not shown), or a distributed computing environment that includes one or more of these stand-alone systems interconnected with one another by way of the intranet 204.

Furthermore, although only a single agent terminal 206 is shown in FIG. 2 for simplicity, it should be appreciated and understood that the monitoring system 200 is applicable to monitor numerous customer service representatives and, therefore, any number of agent terminals 206 are contemplated within the scope of the present invention. The monitoring module 202 may therefore be implemented in whole or in part on each of these numerous agent terminals 206 (or, alternatively, on a central server computer as noted above). Regardless of the actual environment on which the monitoring module 202 is implemented, the recording process 500, unlike the system description above, is described below with reference to a multiplicity of agent terminals 206.

Consistent with the exemplary illustrations described in connection with FIGS. 2 and 3, the recording process 500 is described below with reference to recording interactive data embodying voice communications between the customer and the customer service representative assigned to the user terminal 206. Likewise, the activity data is described in connection with this illustration as being video data embodying movements and physical activities by the customer service representative during the customer service session being recorded. It should be appreciated that other forms of interactive data, e.g., email and chat information, and activity data, e.g., computer screen activity, mouse actions and keyboard actions, are certainly contemplated to be within the scope of the present invention.

The recording process 500 is performed using an operation flow that begins with a start operation 502 and concludes with a finish operation 512. The operation flow of the recording process 500 is initiated in response to the ACD module 108 directing a customer's service call to a specific customer service representative, at which time the start operation 502 passes the operation flow to a query operation 504. In an embodiment, the start operation 502 detects that a specific customer service representative has been selected for a service session by detecting and examining identification and/or signaling data (e.g., G.729 information) embodied in a first packet 203 of the service call received at the associated agent terminal 206.

The query operation 504 determines whether the selected customer service representative is due for recording. In an embodiment, customer service representatives are recorded on a periodic basis defined by a specified interval. The interval may be a time interval or an interval based on the number of service sessions since the last recorded service session for a particular customer service representative. In this embodiment, the query operation 504 determines the last time that the selected customer service representative has been recorded and, if this recording was not made within the specified interval, then the query operation 504 identifies the selected customer service representative as being due for recording.

In another embodiment, customer service representatives may be recorded pursuant to a request from a supervisor, and in this embodiment, the query operation 504 determines whether such a request has been made. For example, requests to record a specific customer service representative may be entered into the monitoring module 202 by way of the server computer 222. Therefore, when selected for a service call, the query operation 504 identifies the selected customer service representative as being due for recording. In yet another embodiment, all service calls directed to one or more of the customer service representatives may be scheduled for recording, and in this embodiment, the query operation 504 recognizes the selected customer service representative as one of the representatives that are due for permanent recording and identifies him/her as such. Regardless of the embodiment employed, if the selected customer service representative is due for recording, the operation flow is passed to a create operation 506. Otherwise, the operation flow concludes at the finish operation 512.

The create operation 506 creates an empty, or "skeleton," media file for storing the interactive data and the activity data recorded during the instant service session. As described above with reference to the system environment, the media file is a data structure that will embody both the audio recordings (i.e., interactive data) and the video recordings (i.e., activity data) of the service session between the selected customer service representative and the customer. As described herein for illustrative purposes, the create operation 506 involves creating and storing the media file in the memory of the agent terminal 206 until such time that the media file is uploaded to the database 220. In an alternative embodiment, however, the media file may be created in the database 220 and, as the interactive data and the activity data is received into the agent terminal 206, both forms of data are synchronized with one another and streamed in substantially real time to the database 220. After the empty media file has been created, the operation flow passes to a data capture operation 508.

The data capture operation 508 captures the activity data recorded by the video capture device 210 and the interactive data carried in the payload of the packets 203 that are incoming and outgoing to the agent terminal 206 assigned to the selected customer service representative. The data capture operation 508 also stores both the interactive data and the activity data to the media file in synchronized fashion such that each segment of interactive data is associated by time reference with a segment of activity data, as illustratively shown in FIG. 3. The data capture operation 508 is described in greater detail in FIG. 6 in accordance with an exemplary embodiment of the present invention. At the conclusion of the service session, the data capture operation 508 passes the operation flow to an upload operation 510.

In accordance with an embodiment, the upload operation 510 maintains the media file on the agent terminal 206 until the specified time for uploading to the database 220. As described above with reference to the system environment, such timing may be specified to take place at the conclusion of each recorded service session or, alternatively, after every specified number of recorded service sessions. At the specified time, the upload operation 510 uploads the media file to the database 220 for storage and subsequent access by the server computer 222. From the upload operation 510, the operation flow concludes at the finish operation 512.

Figure 6:
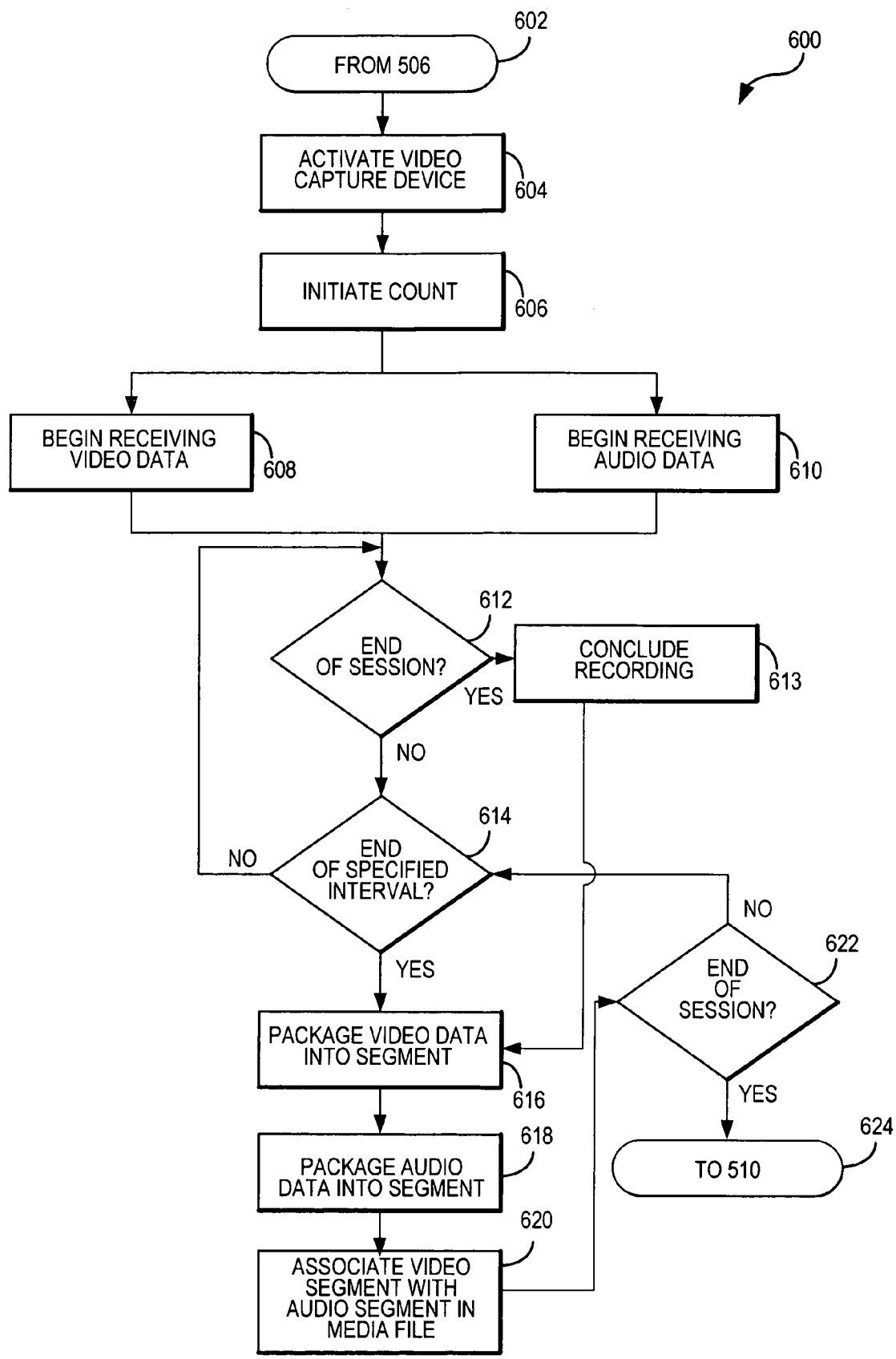
FIG. 6 is a flow diagram illustrating operational characteristics of the monitoring process shown in FIG. 5 in more detail in accordance with an embodiment of the present invention.

Turning now to FIG. 6, the data capture operation 508 is described in more detail in accordance with an embodiment of the present invention. Specifically, FIG. 6 illustrates a collection of operational characteristics embodying a process 600 for storing interactive data and activity data captured during a service session to a media file. As with FIG. 5, the storage process is described with reference to the interactive data being voice communications (contained in packets) and the activity data is described with reference to the activity data being video data (captured by the video capture device 210) in accordance with an exemplary embodiment of the present invention. The storage process 600 is initiated at the conclusion of the create operation 506 and is practiced using an operation flow that starts with a transfer operation 602. The transfer operation 602 transfers the operation flow of the recording process 500 to the operation flow of the storage process 600. From the transfer operation 602, the operation flow initially proceeds to an activate operation 604.

The activate operation 604 activates the video capture device 210 communicatively connected to the agent terminal 206 assigned to the selected customer service representative, thereby initiating video recording of the service session. From the activate operation 604, the operation flow passes to a count operation 606. The count operation 606 selects an initial time reference for the service session (e.g., 0 seconds) and initiates a counting procedure to measure the amount of time elapsed during recording of the service session.

With the counting initiated, the operation flow passes in substantially concurrent fashion to a video receive operation 608 and an audio receive operation 610. The video receive operation 608 begins receiving the video data captured by the video capture device 210 and storing the received video data to memory on the agent terminal 206. Likewise, the audio receive operation 610 begins copying the audio data from the payloads of incoming and outgoing packets 203 and storing the received audio data to memory on the agent terminal 206. With the reception of both forms of data still being accomplished, the operation flow passes (again, in substantially concurrent fashion) from the video receive operation 608 and the audio receive operation 610 to a first query operation 612.

The first query operation 612 determines whether the service session being recorded is complete. Such a determination may be made by analyzing signaling information embodied in the packets 203 to detect an "end of call" designation or other like indicia. If the service session is complete, the operation flow passes to conclude operation 613, which, in a general sense, halts both the receive operation 608 and the audio receive operation 610. To accomplish this, the conclude operation 613 de-activates the video capture device 210 and concludes the discovery of audio data within any incoming or outgoing packets (though, at the conclusion of the session, it should be understood that few to no packets 203 will be transmitted to or from agent terminal 206 to the ACD module 108). From the conclude operation 613, the operation flow passes to a video package operation 616, which is described below. If, however, the service session is not complete, the operation flow passes from the first query operation 612 to a second query operation 614.

The second query operation 614 determines whether the count from the initial time reference (with respect to the first iteration) or the conclusion of the previous time interval (with respect to the subsequent iterations) has reached a specified interval that corresponds to the predetermined size specified for the video and audio segments. If the specified interval has not been reached, the operation flow passes back to the first query operation 612 and continues in a loop between the first query operation 612 and the second query operation 614 until either (1) the session is ended; or (2) the end of the specified interval has been reached. At the end of the specified interval, the operation flow is passed from the second query operation 614 to the video package operation 616. Again, the reception of video and audio data initiated by the video receive operation 608 and the audio receive operation 610 is maintained even with the operation flow passing away from the second query operation 614.

The video package operation 616 retrieves the video data that has been received and stored in memory of the agent terminal 206 since the initiation of the counting (with respect to the first iteration) or the previous time interval (with respect to subsequent iterations) and packages the video data into a segment of predetermined size, as described above. From the video package operation 616, the operation flow passes to an audio package operation 618. Similarly, the audio package operation 618 retrieves the audio data that has been received and stored in memory of the agent terminal 206 since the initiation of the counting (with respect to the first iteration) or the previous time interval (with respect to subsequent iterations) and packages the audio data into a segment of the same predetermined size.

It should be appreciated that the order of operation of the video package operation 616 and the audio package operation 618 is illustrative only and, that in accordance with other embodiments, the order of operation may be reversed or performed substantially simultaneously. Regardless of the implementation, after both audio data and the received video data have been segmented, the operation flow passes to a synchronize operation 620.

The synchronize operation 620 saves the audio segment created by the audio package operation 618 and the video segment created by the video package operation 616 to the media file created by the create operation 506 in association with one another according to a common time reference, as illustrated in the representation 300 shown in FIG. 3 in accordance with an exemplary embodiment. Saved in this manner, playback of the audio segment will be synchronized with playback of the video segment. From the synchronize operation 620, the operation flow passes to a third query operation 622, which determines whether the first query operation 612 determined the session to be complete or incomplete. It should be appreciated that the third query 622 does not determine whether the session is complete or incomplete by itself, but rather relies on the decision by the first query operation 612 due to the maintenance of reception of audio and video data during the package operations 616, 618 and the synchronize operation 620 (if the first query operation 612 indeed determined the session to not be complete).

If the first operation 612 determined the service session to be complete, the third query operation 622 passes the operation flow to a second transfer operation 624. The second transfer operation 624 transfers the operation flow back to the recording process 500, which resumes at the upload operation 510. Otherwise, the operation flow passes from the third query operation 622 back to the second query operation 614 and the storage process 600 continues to further store (and synchronize) audio data and video data to the media file, as previously described.

Figure 7:
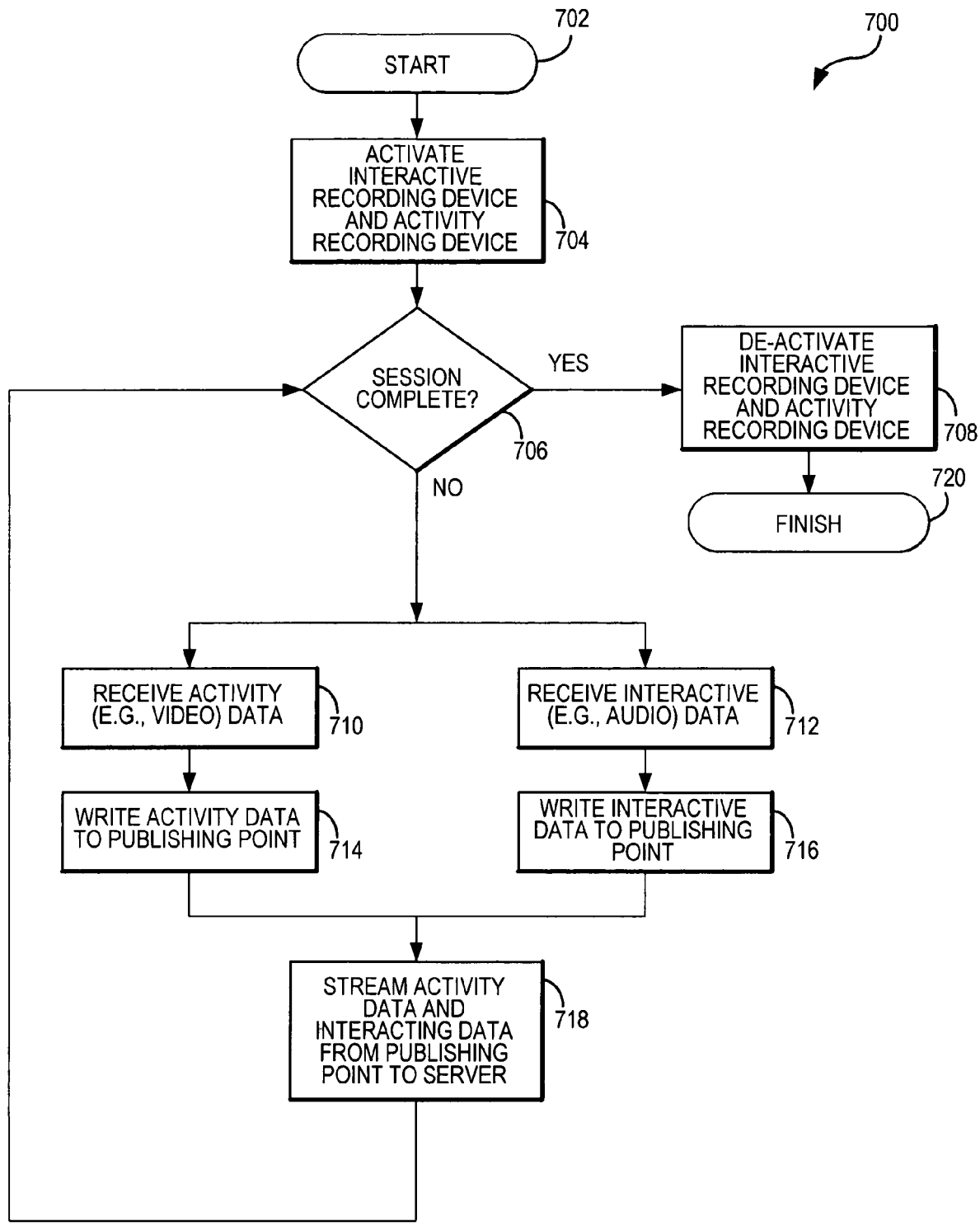
FIG. 7 is a flow diagram illustrating operational characteristics of a process for monitoring interaction between a customer service representative and a customer in substantially real time in accordance with an embodiment of the present invention.

Turning now to FIG. 7, a process 700 for monitoring interaction between a customer and a customer service representative in substantially real time is shown in accordance with an embodiment of the present invention. With reference to FIG. 2, this embodiment involves a user (e.g., supervisor) operating the server computer 222 to monitor a customer service session as the session occurs. The monitoring operation is initiated with a start operation 702 and concludes with a terminate operation 720. Again, consistent with the exemplary descriptions above, the monitoring process 700 is described herein with reference to the monitoring system 200 shown in FIG. 2 as well as the exemplary embodiment in which the recorded interactive data embodies audio data exchanged between the customer and the customer service representative during the session and the recorded activity data embodies video data documenting physical movements and actions by the representative during the session.

The start operation 702 is initiated in response to the agent terminal 206 being selected for recording, at which time the operation flow passes to an initiate operation 704. The initiate operation 704 activates the interactive recording device 230 for capturing the audio communications between the customer and the customer service representative and the activity recording device 232 for capturing the video data from the video capture device 210. From the initiate operation 704, the operation flow passes to a query operation 706. The query operation 706 determines whether the session is complete and, if so, passes the operation flow to a de-activate operation 708, which de-activates the interactive recording device 230 and the activity recording device 232. The operation flow then concludes at the terminate operation 720.

If, however, the query operation 706 determines that the session is not complete, the operation flow is passed substantially simultaneously to an activity data receive operation 710 and an interactive data receive operation 712. The activity receive operation 710 captures the video data recorded by the video capture device 210 and the interactive data receive operation 712 captures the audio data carried in the payload of the packets 203 that are incoming and outgoing to/from the agent terminal 206. From the activity data receive operation 710 and the interactive data receive operation 712, the operation flow substantially simultaneously passes to an activity data transmit operation 714 and an interactive data transmit operation 716, respectively.

The activity data transmit operation 714 writes the received video data to a publishing point, which in an embodiment is a software module or component of the monitoring module 202 that may be subscribed by a user of the server computer 222 to monitor sessions in real time. Likewise, the interactive data transmit operation 716 writes the received audio data to the publishing point. From both the activity data transmit operation 714 and the interactive data transmit operation 716, the operation flow passes substantially simultaneously to a stream operation 718, which streams the published video data and audio data to the server computer 222, which is operated by a user (e.g., supervisor) to monitor the session in real time. From the stream operation 718, the operation flow passes back to the query operation 706 and continues as previously described.

Having described the embodiments of the present invention with reference to the figures above, it should be appreciated that numerous modifications may be made to the present invention that will readily suggest themselves to those skilled in the art and which are encompassed in the spirit of the invention disclosed and as defined in the appended claims. Indeed, while a presently preferred embodiment has been described for purposes of this disclosure, various changes and modifications may be made which are well within the scope of the present invention.

For example, while a VOIP soft phone 208 is described for use with the monitoring system 200, it should be appreciated that other types of phones may be utilized. In which case, the agent terminal 206, while still using the packets 203 for the purposes noted above, would convert the packets 203 to the proper format (e.g., digital, analog etc.) for interpretation by such an alternative phone type.

Furthermore, while the PSTN 104 is shown in FIG. 2 and described in conjunction therewith in accordance with an exemplary environment of the present invention, it should be appreciated that alternative communication networks may be employed between the ACD module 108 and the customer's telephone 102. For example, if the PSTN 104 may be replaced or supplemented with a packet-switched network, if so, the ACD module 108 may be relieved of the task of converting call information to the packet-based format, as described in conjunction with FIG. 2.

Additionally, while the various forms of recorded interactive data and recorded activity data are described herein as being stored together (with associated time references) in the same media file, an alternative embodiment involves these two forms of recorded data being stored in separate files while still being associated based on common time reference. For example, the audio data segments 302 shown in FIG. 3 may actually reside in a separate media file than the video data segments 304. However, the representation 300 of FIG. 3 still applies in that each of the audio data segments 304 (and, thus sub-segments) are associated with a video data segment 304 based on a common time reference 306. Indeed, the location of the physical storage of the individual segments 302 and 304 is irrelevant in accordance with this embodiment so long as each audio segment 302 is associated with a video segment 304 using a common time reference 306.

What is claimed is:

1. A method for monitoring interaction between individuals engaged in a communication session embodied in interactive data transmitted between the individuals by way of a communication network, the method comprising:

receiving the interactive data during transmission between the communication network and a communication device used by a first individual to participate in the communication session, wherein the interactive data is in the form of a plurality of data packets, wherein each data packet comprises a payload region storing a portion of the interactive data;

creating a plurality of segments of the interactive data by grouping together portions of the interactive data embodied in the payload region of a predetermined number of contiguously received data packets, wherein the predetermined number corresponds to a predetermined length of time;

capturing an activity data embodying actions by the first individual during the communication session;

creating a plurality of segments of the activity data according to the predetermined length of time; and associating the plurality of segments of the interactive data with the plurality of segments of the activity data based on a common time reference thereby substantially synchronizing the interactive data and the activity data for subsequent playback.

2. A method as defined in claim 1, wherein the receiving act further comprises:

copying the portions of the interactive data from the payload region of each of the plurality of data packets.

3. A method as defined in claim 2, wherein the associating act comprises:

associating a first segment of the interactive data with a first segment of the activity data, wherein the first segment of the interactive data comprises portions of the interactive data received in the plurality of data packets beginning at an initial time and ending at a second time and wherein the first segment of the activity data comprises video frames captured beginning at the initial time and ending at the second time, the second time occurring the predetermined length in time after occurrence of the initial time.

4. A method as defined in claim 1, further comprising:

saving the associated plurality of interactive data segments and the plurality of activity data segments relative to one another in a media file; and uploading the media file to a database for storage and subsequent access by one or more server computers.

5. A method as defined in claim 4, further comprising:

providing a server computer access to the media file in the database for use in playing the media file thereon such that a user of the server computer is operable to monitor the communication session.

6. A method as defined in claim 1, wherein the first individual is a customer service representative and a second individual engaged in the communication session is a customer.

7. A method as defined in claim 6, wherein the first individual is one of a plurality of customer service representatives, the method further comprising:

in response to receipt of a first of the plurality of data packets, determining that the first individual has been selected from the plurality of customer service representatives to engage in the communication session;

evaluating whether the first individual is due for monitoring; and if the first individual is due for monitoring, performing the receiving act, the capturing act and the associating act.

8. A method as defined in claim 3, wherein the associating act comprises:

associating a next segment of the interactive data with a next segment of the activity data, wherein the next segment of the interactive data comprises portions of the interactive data received beginning at the second time and ending at a third time and wherein the next segment of the activity data comprises the video frames captured beginning at the second time and ending at the third time, the third time occurring the predetermined length in time after occurrence of the second time.

9. A system for monitoring interaction between individuals engaged in communication sessions embodied in interactive data transmitted between the individuals by way of a communication network, the system comprising:
- a client communication device operable for use by a first individual to participate in the communication sessions;
- a monitoring module operable to select for recording the communication sessions to which the first individual has been selected for participation;
- a client computer communicatively connected to the communication network and the client communication device such that the client computer receives the interactive data transmitted therebetween, the interactive data being transmitted between the communication network and the client communication device in the form of a plurality of data packets, each data packet comprising a payload region storing a portion of the interactive data, wherein the client computer comprises an activity recording device operable to record an activity data embodying actions made by the first individual during the communication sessions; and
- a media file comprising the interactive data copied by the client computer during a selected communication session and the activity data recorded by the activity recording device during the selected communication session, wherein a predetermined number of the plurality of data packets contiguously received corresponding to a predetermined length of time are associated with the activity data for the predetermined length of time and are synchronized in the media file according to the predetermined length of time.

10. system as defined in claim 9, further comprising:
- an intranet; and
- a database communicatively connected to the client computer by way of the intranet thereby providing a communication medium for transmitting the media file from the client computer to the database for storage.

11. A system as defined in claim 10, wherein the media file is stored on the database, the system further comprising:
- a server computer communicatively connected to the database and operable to retrieve the media file therefrom, wherein the server computer comprises a media application operable to play the media file when retrieved from the database.

12. A system as defined in claim 11, wherein the database and the server computer are communicatively connected by way of the intranet.

13. A system as defined in claim 10, wherein the media file is created and maintained on the client computer prior to transmission to the database.

14. A system as defined in claim 9, wherein the interactive data is transmitted between the communication network and the client communication device in the form of the plurality of data packets, the system further comprising:
- an intranet; and
- a central server computer communicatively connected to the client computer by way of the intranet and on which the monitoring module is at least partially implemented to examine the plurality of data packets received by the client computer to select the communication sessions for recording.

15. A system as defined in claim 14, wherein the monitoring module is implemented in a distributed computing environment comprising the client computer, the central server computer and the intranet.

16. A system as defined in claim 9, wherein the interactive data is transmitted between the communication network and the client communication device in the form of the plurality of data packets and wherein the client communication device is a VOIP phone.

17. A computer storage medium having computer-executable instructions for performing a method for monitoring interaction between individuals engaged in a communication session, wherein the communication session is embodied in interactive data transmitted between the individuals by way of a communication network, the method comprising:
- receiving the interactive data during transmission between the communication network and a communication device used by a first individual to participate in the communication session, wherein the interactive data is in the form of a plurality of data packets, wherein each data packet comprises a payload region storing a portion of the interactive data;
- creating a plurality of segments of the interactive data by grouping together portions of the interactive data embodied in the payload region of a predetermined number of contiguously received data packets, wherein the predetermined number corresponds to a predetermined length of time;
- capturing an activity data embodying actions by the first individual during the communication session;
- creating a plurality of segments of the activity data according to the predetermined length of time; and
- associating the plurality of segments of the interactive data with the plurality of segments of the activity data based on a common time reference thereby substantially synchronizing the interactive data and the activity data for subsequent playback.

18. A computer storage medium as defined in claim 17, wherein the method comprises:
- creating each segment of the interactive data by grouping together portions of the interactive data received during a plurality of time intervals defined according to the predetermined length in time, wherein each interactive data segment represents the interactive data received during one of the plurality of time intervals; and
- creating each segment of the activity data by grouping together portions of the activity data received during the plurality of time intervals, wherein each activity data segment represents the activity data recorded during one of the plurality of time intervals.

19. A computer storage medium as defined in claim 17, wherein the method comprises:
- saving the associated interactive data segments and activity data segments relative to one another in a media file; and
- uploading the media file to a database for storage and subsequent access by one or more server computers.

20. A computer storage medium as defined in claim 19, wherein the method further comprises:
- providing a server computer access to the media file in the database for use in playing the media file thereon such that a user of the server computer is operable to monitor the communication session.

* * * * *

UNITED STATES PATENT AND TRADEMARK OFFICE
CERTIFICATE OF CORRECTION

PATENT NO. : 7,558,382 B2  Page 1 of 1
APPLICATION NO. : 11/291759
DATED : July 7, 2009
INVENTOR(S) : Torres et al.

It is certified that error appears in the above-identified patent and that said Letters Patent is hereby corrected as shown below:

Column 17,
line 35, Add the word -- A -- after the number "10." and before the word "system".

Signed and Sealed this

First Day of September, 2009

David J. Kappos
*Director of the United States Patent and Trademark Office*